United States Patent
Kawakami et al.

(10) Patent No.: US 9,807,278 B2
(45) Date of Patent: Oct. 31, 2017

(54) IMAGE PROCESSING APPARATUS AND METHOD IN WHICH AN IMAGE PROCESSOR GENERATES IMAGE DATA OF AN IMAGE SIZE CORRESPONDING TO AN APPLICATION BASED ON ACQUIRED CONTENT IMAGE DATA

(71) Applicant: FURYU CORPORATION, Tokyo (JP)

(72) Inventors: Kohei Kawakami, Kyoto (JP); Wakako Sakahara, Kyoto (JP); Tsuneo Okada, Hyogo (JP)

(73) Assignee: FURYU CORPORATION, Tokyo (JP)

( * ) Notice: Subject to any disclaimer, the term of this patent is extended or adjusted under 35 U.S.C. 154(b) by 0 days.

(21) Appl. No.: 14/986,630

(22) Filed: Jan. 1, 2016

(65) Prior Publication Data
US 2016/0277633 A1    Sep. 22, 2016

(30) Foreign Application Priority Data
Mar. 17, 2015  (JP) ................. 2015-054014

(51) Int. Cl.
| | |
|---|---|
| G06K 15/02 | (2006.01) |
| H04N 1/393 | (2006.01) |
| H04N 1/387 | (2006.01) |
| H04N 1/00 | (2006.01) |

(52) U.S. Cl.
CPC .......... *H04N 1/393* (2013.01); *G06K 15/024* (2013.01); *H04N 1/00161* (2013.01); *H04N 1/00251* (2013.01); *H04N 1/00265* (2013.01); *H04N 1/387* (2013.01); *H04N 1/3876* (2013.01); *H04N 2201/0068* (2013.01)

(58) Field of Classification Search
USPC ........ 358/1.1, 1.2, 2.1, 1.16–1.18, 448, 452, 358/537
See application file for complete search history.

(56) References Cited

U.S. PATENT DOCUMENTS

| | | | | |
|---|---|---|---|---|
| 2004/0081440 A1* | 4/2004 | Miwa | .................... | G03B 15/00 396/2 |
| 2010/0255904 A1* | 10/2010 | Kidakarn | ............... | G03B 17/24 463/30 |
| 2015/0138378 A1* | 5/2015 | Imahira | .............. | H04N 1/00161 348/207.2 |
| 2015/0249754 A1* | 9/2015 | Tada | .................. | H04N 1/00167 348/207.1 |
| 2015/0304554 A1* | 10/2015 | Matsubara | ......... | H04N 5/23293 348/239 |

FOREIGN PATENT DOCUMENTS

| | | |
|---|---|---|
| JP | 5304233 B | 7/2010 |
| JP | 2014-174333 A | 9/2014 |

* cited by examiner

*Primary Examiner* — Marcellus Augustin
(74) *Attorney, Agent, or Firm* — Capitol City TechLaw

(57) ABSTRACT

An image processing apparatus for editing an image by using content images different in image size for the same content image depending on applications includes a data acquiring unit configured to acquire content image data having a predetermined image size; an image processor configured to generate image data of an image size corresponding to each application based on the acquired content image data; and a data storage device configured to store the acquired image data and the generated image data.

6 Claims, 14 Drawing Sheets

DIVISION SELECTION SCREEN (9) PRINT IMAGE:2000 × 2400

STICKER SHEET

SCREEN DURING PHOTOGRAPHING

SCREEN AFTER PHOTOGRAPHING

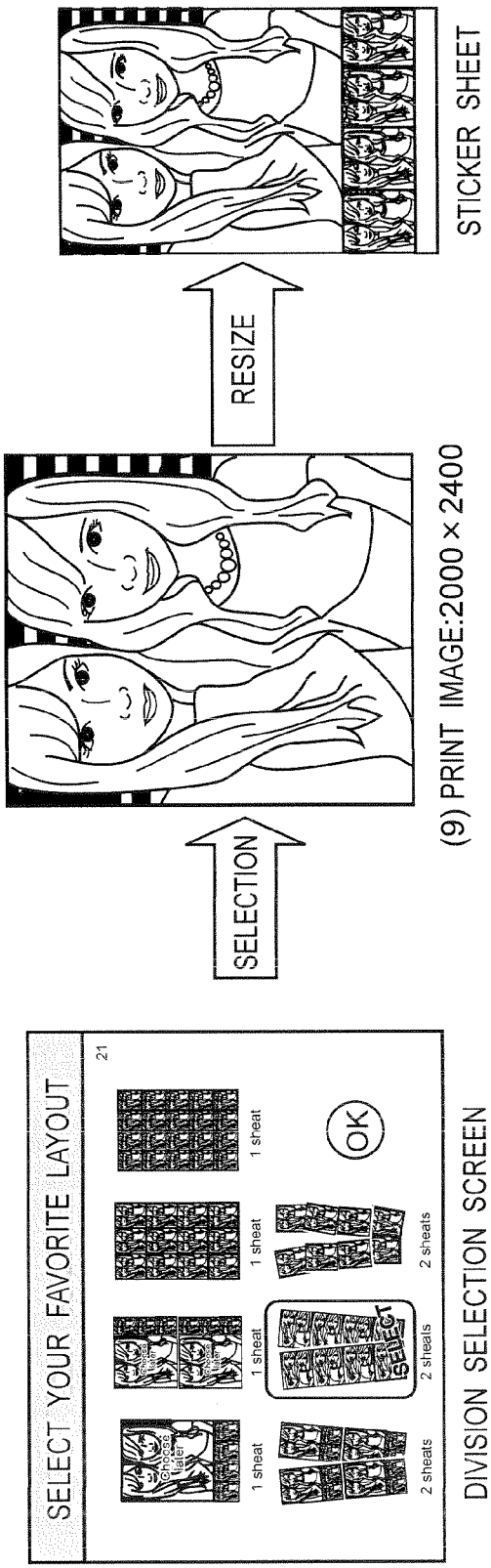

IMAGE PROCESSING APPARATUS AND METHOD IN WHICH AN IMAGE PROCESSOR GENERATES IMAGE DATA OF AN IMAGE SIZE CORRESPONDING TO AN APPLICATION BASED ON ACQUIRED CONTENT IMAGE DATA

BACKGROUND OF THE INVENTION

1. Technical Field

The present invention relates to an image processing apparatus for editing and printing a photographed image on a sticker sheet.

2. Related Art

Conventionally, a photo sticker creating apparatus is known that photographs a user (object) and that edits and prints a photographed image on a sticker sheet to provide the image as a photo sticker or to transmit the image as a photo image to a user's portable terminal (see, e.g., Patent Document 1 (JP5304233B) and Patent Document 2 (JP2014-174333A)).

The photo sticker creating apparatus enables a user to enjoy a photo sticker creating operation as a game (a photo sticker creating game). The photo sticker creating game is performed in a flow including photographing an object, editing a photographed image, and outputting (printing) an edited image to a photo sticker. The user can play this series of steps within a limited time with the photo sticker creating apparatus and can receive a photo sticker created as a resulting product.

Content image data of background and foreground images composited with a photographed image have a different image size for each application such as for display during photographing, for display during edit, for print, and for transmission to portable terminal. Therefore, conventionally, the content image data is prepared and installed in the apparatus in advance for each of image sizes corresponding to the applications. Then, each of the content image data is read out as needed and the image thereof is displayed on a screen.

Conventionally, in case that the content image data are switched, for example, at the time of version upgrade of a photo sticker machine, each of the content image data is handled such that all the content image data are switched by using a CD or distribution through a network.

SUMMARY OF THE INVENTION

In case that content image data are switched, all the image data of a plurality of image sizes must be installed for the same content image data. Therefore, considerable time and effort are required when the content image data are switched.

An object of the present invention is to solve the aforementioned problems and provide an image processing apparatus, an image processing method, and an image processing program, which can reduce a workload at the time of update of the content image data.

An image processing apparatus according to the present invention is an image processing apparatus for editing an image by using content images different in image size for the same content image depending on applications. The image processing apparatus includes a data acquiring unit configured to acquire content image data having a predetermined image size; an image processor configured to generate image data of an image size corresponding to each application based on the acquired content image data; and a data storage device configured to store the acquired image data and the generated image data.

An image processing method according to the present invention is an image processing method for editing an image by using content images different in image size for the same content image depending on applications. The image processing method includes acquiring content image data having a predetermined image size; generating image data of an image size corresponding to each application based on the acquired content image data; and storing the acquired image data and the generated image data.

A non-transitory computer-readable storage medium according to the present invention stores an image processing program for allowing a computer to execute the image processing method as described above.

According to the present invention, by installing the content image data of one image size, the image sizes corresponding to all the applications can be generated and stored. This eliminates the need to install the content image data of all the image sizes corresponding to the applications, and therefore, it is possible to reduce the time and effort required for installing.

BRIEF DESCRIPTION OF DRAWINGS

FIG. 13 is a diagram showing one example of a screen for print after photographing (division-selection-screen print screen).

DETAILED DESCRIPTION OF EMBODIMENTS

A specific embodiment of the present invention will now be described with reference to the accompanying drawings.
First Embodiment A photo sticker creating apparatus of one embodiment of the present invention is a game apparatus (game service providing apparatus) allowing a user to perform photographing, editing, and the like as a game (game service) and providing a photographed/edited image as a photo sticker or data to the user. A photo sticker creating apparatus 1 is disposed in a game arcade, a shopping mall, a store in a tourist site, and the like.

In a game provided by the photo sticker creating apparatus, a user photographs himself/herself and the like with a camera disposed in the photo sticker creating apparatus. The user composes a foreground image and/or a background image to a photographed image, or edits the photographed image, thereby designing the photographed image into a colorful image. After the game ends, the user receives a photo sticker and the like printed with the edited image as a resulting product. Alternatively, the photo sticker creating apparatus provides the edited image to a user's portable terminal and the user can receive a resulting product with the portable terminal.

1. Configuration of Photo Sticker Creating Apparatus
    1.1. Appearance

Figure 1A:
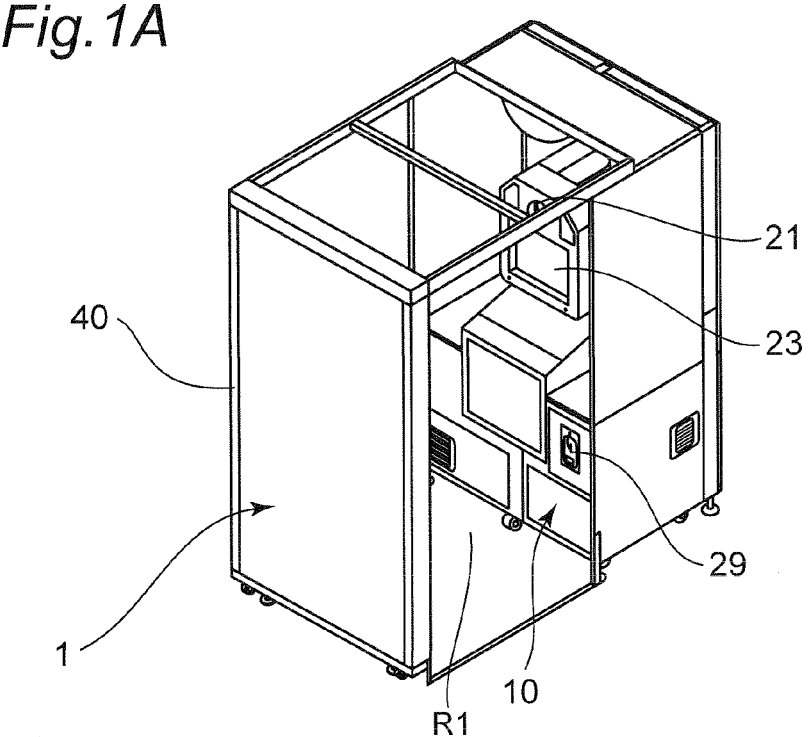
FIG. 1A is a perspective view of a photo sticker creating apparatus according to one embodiment of the present invention.
Figure 1B:
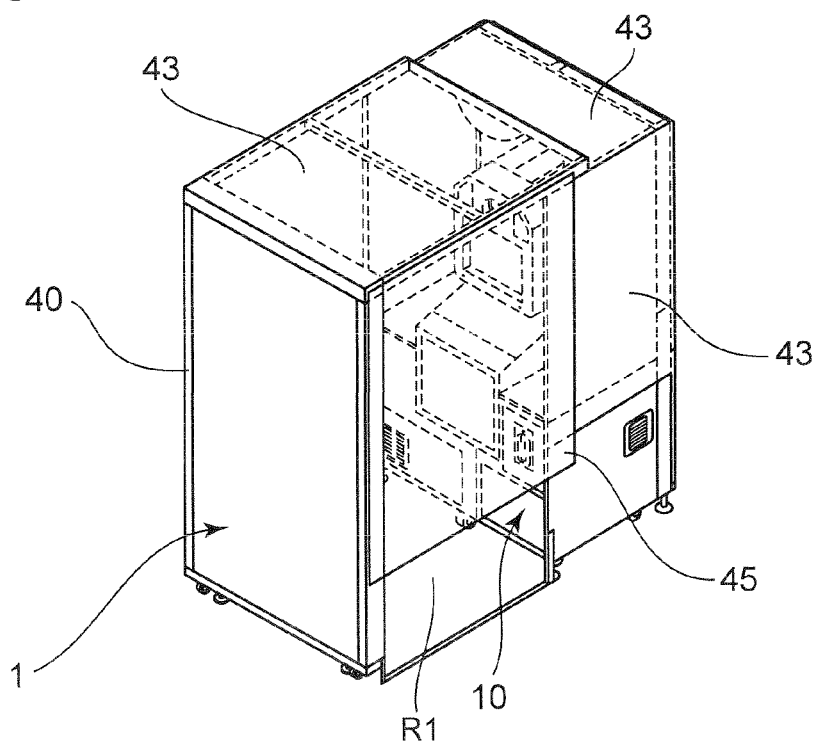
FIG. 1B is a perspective view of a photo sticker creating apparatus according to one embodiment of the present invention.

FIGS. 1A and 1B are diagrams respectively showing an appearance of a photo sticker creating apparatus according to one embodiment of the present invention. As shown in FIG. 1A, the photo sticker creating apparatus 1 of an image processing apparatus is made up of a photographing unit 10 for photographing and editing and a background unit 40 for controlling a background during photographing. A space between the photographing unit 10 and the background unit 40 constitutes a photographing space R1 in which a user performs a photographing.

When disposed and used in a game arcade etc., as shown in FIG. 1B, the photo sticker creating apparatus 1 is disposed in such a state that a portion of an upper portion and a side portion of the photo sticker creating apparatus 1 is covered with a shielding sheet 43. Further, the photo sticker creating apparatus 1 is disposed in such a state that an opening portion (entrance/exit for a user) between the photographing unit 10 and the background unit 40 is covered with a curtain 45 on a lateral side. In this way, the space inside the photo sticker creating apparatus 1 (the photographing space R1) is shielded from the outside by the curtain 45. This allows a user to photograph an image in the photographing space R1 without caring about people's eyes on the outside. On the other hand, the curtain 45 does not cover the lower portion of the opening portion (entrance/exit) on the lateral side of the photo sticker creating apparatus 1, and therefore, the photographing space R1 is prevented from being completely closed for security reasons. The curtain 45 and the shielding sheet 43 are printed with an image for advertisement, information on procedures of the game of the photo sticker creating apparatus 1, and the like.

Figure 2A:
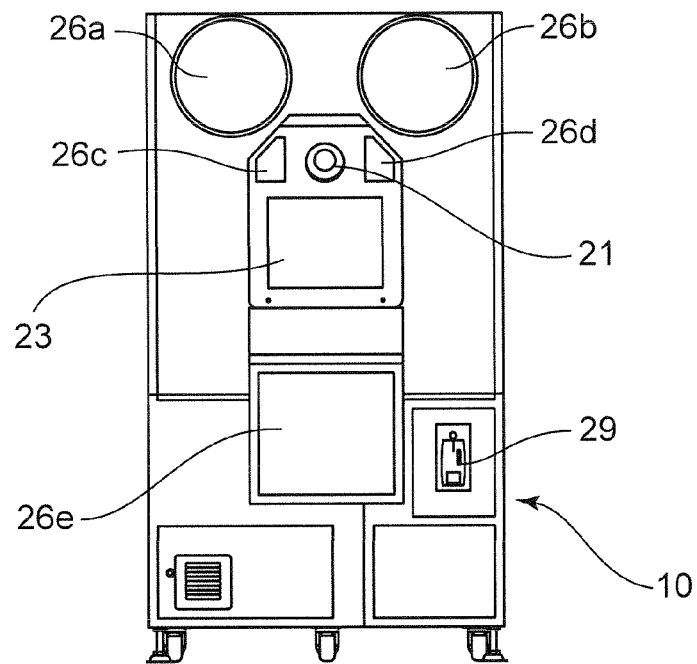
FIG. 2A is a front view of the photo sticker creating apparatus.
Figure 2B:
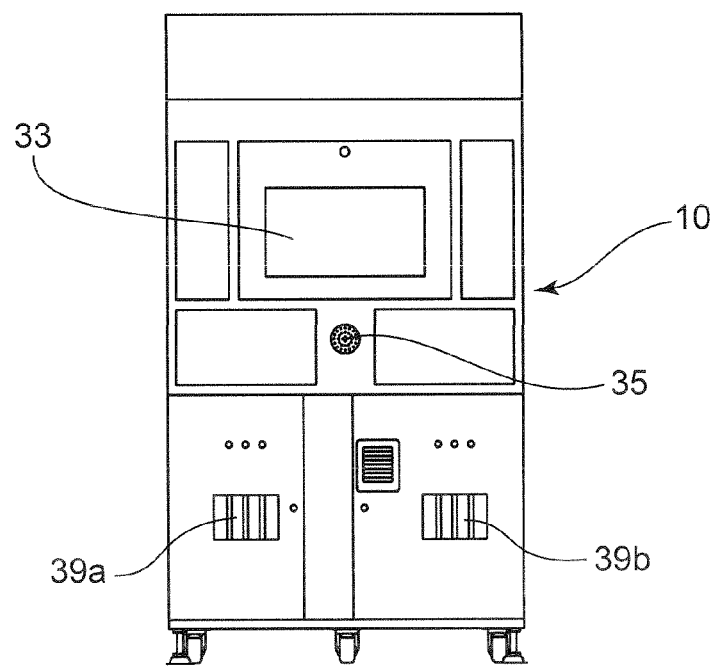
FIG. 2B is a rear view of the photo sticker creating apparatus.

FIGS. 2A and 2B show a front view and a rear view, respectively, of the photographing unit 10. As shown in FIG. 2A, a front face of the photographing unit 10 is disposed with a camera 21, illumination apparatuses 26a to 26e, a touch panel monitor 23, and a coin insert/return slot 29. It is noted that a bill/credit-card reader or a money changer may be disposed instead of the coin insert/return slot.

The camera 21 photographs an image of an object (user) to generate a photographed image. The camera 21 is made up of an imaging element such as a CCD (charge-coupled device) or CMOS (complementary metal oxide semiconductor) image sensor. The camera 21 is not limited to the example shown in FIG. 2 in terms of the position and the number of the camera 21

The touch panel monitor 23 displays guidance, a demonstration screen, etc. of the photo sticker creating game and a game method thereof. The touch panel monitor 23 accepts an instruction from a user through a touch operation. The touch panel monitor 23 is made up of an LCD (liquid crystal display), an organic EL display, etc. A colorless and transparent touch sensor (e.g., of a pressure-sensitive or electromagnetic induction type) is superimposed on a screen of the touch panel monitor 23 and positional information (instruction from a user) can be input by touching with, for example, a stylus pen or a user's finger. The touch panel monitor 23 displays a background image selection screen that is a GUI for selecting an image of background and/or foreground (composition image) to be composited with the photographed image generated by the camera 21.

The illumination apparatuses 26a to 26e are apparatuses for irradiating an object with illumination light during photographing of an image of the object. The illumination apparatuses 26a to 26e are made up of a fluorescent light, a LED (light emitting diode) illumination device, an illumination device capable of stroboscopic light emission, etc.

The coin insert/return slot 29 is an opening portion for allowing a user to input a charge for the photo sticker creating game and to receive the change etc. A side surface of the photographing unit 10 is disposed with a speaker (not shown) for outputting a guidance sound, a sound effect, etc. to a user in the photographing space R1.

As shown in FIG. 2B, the rear face of the photographing unit 10 is disposed with a tablet built-in monitor 33, a speaker 35, and sticker discharge ports 39a, 39b.

The tablet built-in monitor 33 displays an edit screen that is a GUI (graphical user interface) for editing a photographed image generated by a photographing operation in the photographing space R1. The edit screen is formed to concurrently display two images to be edited so that a pair of users uses respective stylus pens to separately edit graffiti. The two concurrently displayed images targeted for the graffiti editing may be the same images or different images.

The tablet built-in monitor 33 is made up of a tablet to which positional information can be input with a stylus pen, and a monitor having a display device capable of displaying an image. The tablet is, for example, a pressure-sensitive or electromagnetic induction type input device (touch sensor), is colorless and transparent, and is superimposed and disposed on a display screen of the display device. The display device is made up of an LCD (liquid crystal display), an organic EL display, etc. Therefore, the tablet built-in monitor 33 not only simply displays a GUI image etc. by the display device but also accepts an input operation from a user by the tablet. The tablet built-in monitor 33 may include a touch panel monitor and may allow the user to input information with a finger etc.

The speaker 35 outputs sounds such as a guidance sound, a sound effect, and BGM related to an edit operation of the photo sticker creating game. It is noted that the number, design, shape, and the like of the disposed speakers 35 are arbitrary.

The sticker discharge ports 39a, 39b discharge a photo sticker generated by reflecting the selection made in the photographing space R1 and details of editing performed in an editing space R2 based on the photographed image photographed in the photographing space R1.

1.2. Internal Configurations

Figure 3:
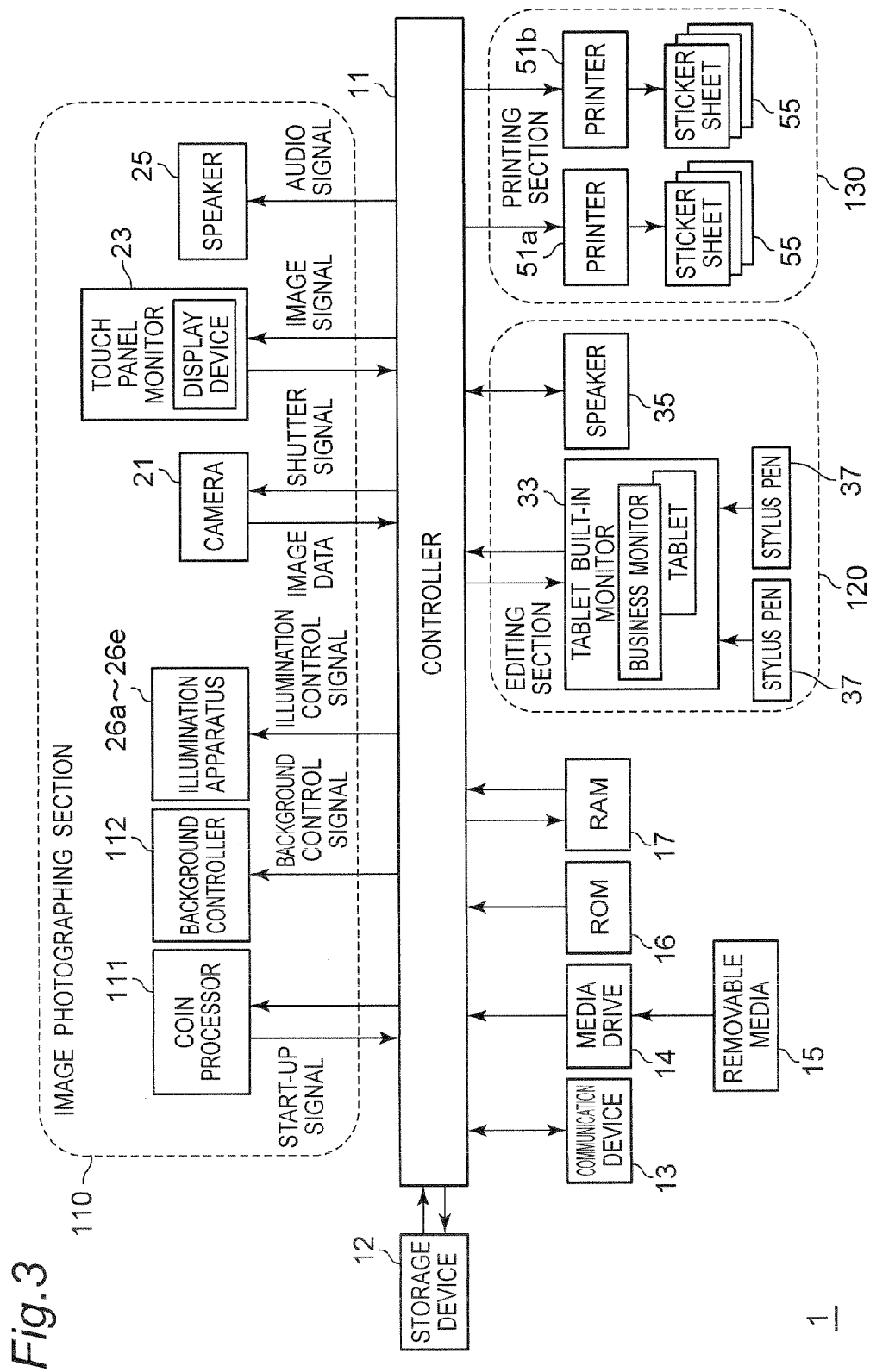
FIG. 3 is a diagram showing internal constitutes of the photo sticker creating apparatus.

Internal configurations of the photo sticker creating apparatus 1 will be described below. FIG. 3 is a block diagram showing one example of a functional configuration of the photo sticker creating apparatus 1. The same constituent elements as the constituent elements described above are denoted by the same reference numerals and will not be described.

As shown in FIG. 3, the photo sticker creating apparatus 1 has a controller 11 for controlling an overall operation of the photo sticker creating apparatus 1. The controller 11 is respectively connected via a predetermined bus to a storage device 12, a communication device 13, a media drive 14, a ROM (read only memory) 16, a RAM (random access memory) 17, an image photographing section 110, an editing section 12, and a printing section 130. The controller 11 is made up of a CPU or an MPU and executes a predetermined program to implement general functions of the photo sticker creating apparatus 1 including functions described below. The predetermined program may be installed in the photo sticker creating apparatus directly or through a communication line from a predetermined recording medium. The predetermined recording medium includes, for example, magnetic disks such as a hard disk drive (HDD), a solid state drive (SSD), and a floppy (registered trademark) disk, optical disks such as CD (compact disc), DVD (digital versatile disc), and BD (Blu-ray disc) (registered trade mark), magnetic optical discs such as MD (mini disc) (registered trade mark), or a removable medium such as a memory card. It is noted that the controller 11 may be designed as a dedicated electronic circuit for implementing a predetermined function. That is, the controller 11 may be made up of CPU, MPU, DSP, FPGA, ASIC, or ASSP.

The storage device 12 includes a non-volatile storage medium such as a hard disk drive (HDD), a flash memory, and a solid state drive (SSD). The storage device 12 stores various pieces of configuration information and reads and supplies the stored configuration information to the controller 11. The recording medium making up the storage device 12 may be any non-volatile recording medium.

The communication device 13 communicates with another communicating device (not shown) through an external network (not shown) such as the internet and a public telephone network, for example, or simply through a communication cable (not shown). That is, the communication device 13 communicates with another communication device such as a user's portable telephone, a user's personal computer, or central management server under the control of the controller 11. For example, the communication device 13 transmits transmission information supplied from the controller 11 to another communication apparatus and supplies reception information supplied from another communication apparatus to the controller 11.

The media drive 14 is loaded with a removable medium 15 such as a magnetic disk (including a flexible disk), an optical disk (such as CD, DVD, and BD), a magnetic optical disk, or a semiconductor memory. A computer program and data are read from the removable medium 15 and supplied to the controller 11 or stored or installed in the storage device 12 etc.

The ROM 16 preliminarily stores the program and data executed by the controller 11. The ROM 16 supplies the program and data to the controller 11 based on an instruction of the controller 11. The RAM 17 temporarily keeps the data and program executed by the controller 11.

The image photographing section 110 is a block related to a photographing process and has a coin processor 111, a background controller 112, the illumination apparatuses 26a to 26e, the camera 21, the touch panel monitor 23, and a speaker 25.

The camera 21 captures a moving image for live-view display before photographing and outputs the image data of the captured moving image to the controller 11. The camera 21 outputs to the controller 11 the image data acquired by photographing, which is performed based on an instruction from a user of an object. In this case, when receiving the image data from the camera 21, the controller 11 generates an image signal based on the received image data and outputs the image signal to the touch panel monitor 23.

When receiving the image signal from the controller 11, the touch panel monitor 23 displays on a display device a still image or a moving image (live view) of the photographed object based on the received image signal.

The coin processor 111 counts coins inserted from the coin insert/return slot 29 and transmits a signal indicative of a counted amount to the controller 11. The controller 11 determines whether coins are inserted in a predetermined amount based on the signal from the coin processor 111. The background controller 112 controls a background curtain hung as a background behind an object (on the background unit side) in the photographing space R1. That is, the background controller 112 hangs and houses the background curtain under the control of the controller 11. It is noted that the background unit 40 may have structure with a chroma-key composition curtain affixed to a sheet metal. Alternatively, the background unit 40 may be made up only of a sheet metal painted in predetermined color (e.g., green). The color of the sheet metal may be color such as white matched to a background image. In case that hanging/housing the background curtain does not have to be controlled in the background unit 40, the background controller 112 may not be included.

An editing section 120 is a block related to an edit process, and includes the tablet built-in monitor 33, a stylus pen 37, and the speaker 35.

The printing section 130 includes two printers 51a and 51b for printing a result of edit operation performed by the editing section 120 on a sticker sheet 55. Hereinafter, the printer 51a disposed on the left side viewed from the rear side of the photo sticker creating apparatus 1 will be referred to as a "first printer" and the printer 51a disposed on the right side will be referred to as a "second printer." Only one printer is operated between the first printer 51a and the second printer 51b. The other printer is secondarily used instead of the printer in operation when sticker sheets run out in the printer in operation or when the printer in operation fails. The first and second printers 51a and 51b acquire image information edited by the controller 11 for printing on the sticker sheet 55. When completing a printing process, the first and second printers 51a and 51b discharge the printed sticker sheet 55 from the sticker discharge ports 39a, 39b. This printed sticker sheet 55 is provided to a user as a photo sticker that is a resulting product of the photo sticker creating game.

2. Operation of Photo Sticker Creating Apparatus

2.1. Flow of Photo Sticker Creating Game

A flow of a photo sticker creating game by the photo sticker creating apparatus 1 and user's movement associated therewith will be described with reference to FIG. 4.

Figure 4:
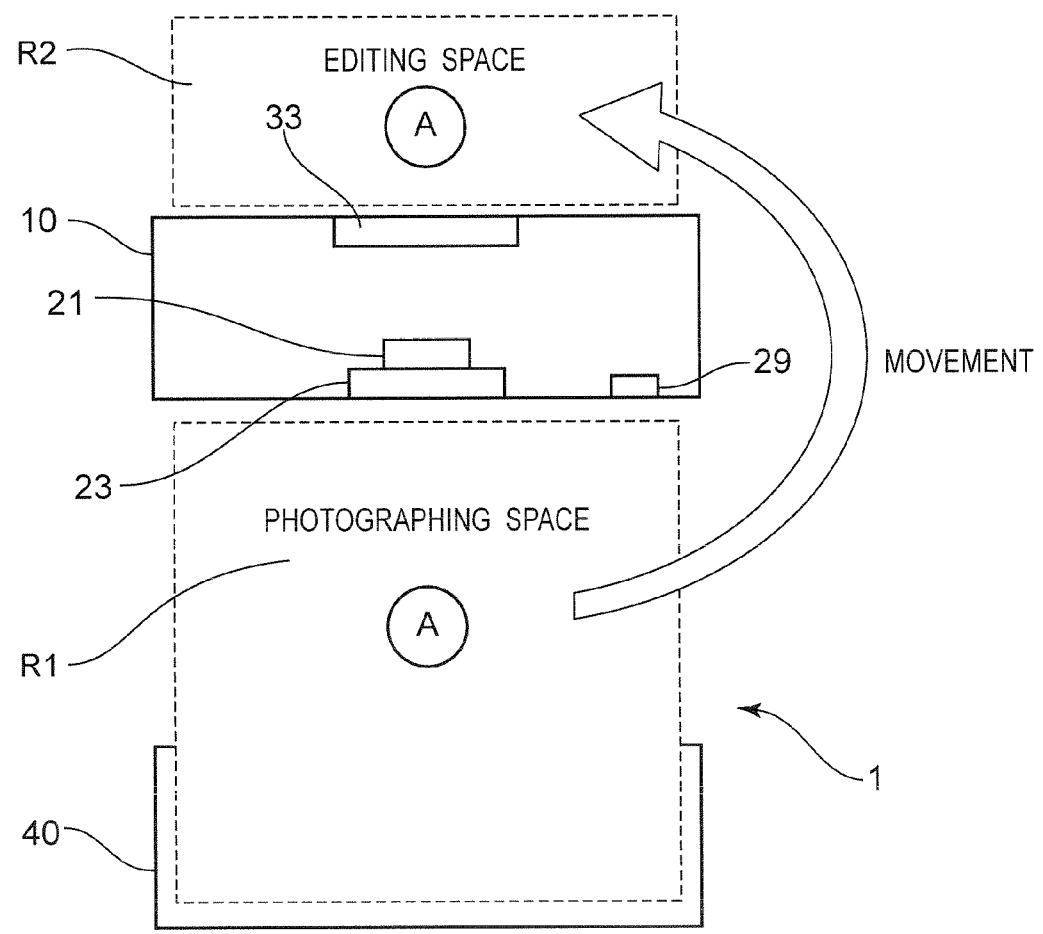
FIG. 4 is a diagram for explaining user's spatial movement during a photo sticker creating game.

FIG. 4 is a diagram for explaining user's spatial movement during the game. FIG. 4 shows a view when the photo sticker creating apparatus 1 is viewed in its entirety from above. As shown in FIG. 4, a user A enters the photographing space R1 from a lateral side of the photo sticker creating apparatus 1 and puts the charge into the coin insert/return slot 29 of the photographing unit 10 to start the photo sticker creating game. Subsequently, the user A selects a background image and photographs and image with the camera 21 in the photographing space R1. That is, in the photographing space R1, the user A utilizes the camera 21 and the touch panel monitor 23 disposed in the front face of the photographing unit 10 to select the background image to be composited with a photographed image and to photograph an image of the user A and the like (the photographing operation).

When completing the selection of the background image and the photographing, the user A moves to the editing space R2 located behind the photographing unit 10 in accordance with guidance (leading) of the photo sticker creating apparatus 1. The user A operates the tablet built-in monitor 33 to perform an edit operation such as writing graffiti on the photographed image in the editing space R2. It is noted that, If a user of the preceding group is using the editing space R2 (performing the edit operation) when the selection of the background image and the photographing are completed in the photographing space R1, the photo sticker creating apparatus 1 does not guide the user A to the editing space R2. In this case, the user A waits in the photographing space R1 until the editing space R2 becomes available. Subsequently, when the user of the preceding group terminates the edit operation, the photo sticker creating apparatus 1 guides the user A to the editing space R2 and the user A moves to the editing space R2 in accordance with the guidance. When it is determined that operations are concurrently performed in the photographing space R1 and the editing space R2, the photo sticker creating apparatus 1 may control the photographing process such that a photographing time becomes longer in the photographing space R1 or may control the edit process such that an edit time becomes shorter in the editing space R2, so as to reduce the waiting time of the user.

As described above, it is possible to separate the photographing space R1 for photographing and the editing space R2 for editing an image, and therefore, it is possible to guide different users to the respective spaces. Therefore, two groups of users can enjoy games at the same time in the one photo sticker creating apparatus 1. Thus, as compared to the case where the photographing and editing are performed in one space, it is possible to increase a rate of operation of the photo sticker creating apparatus 1.

It is noted that, in the example described above, the photographing and the selection of the background image are performed in the photographing space R1 and the graffiti process and the printing process are executed in the editing space R2. However, a photo sticker apparatus may be configured such that the photographing, the selection of the background image, the graffiti edit, and the printing are performed in respective different spaces. In case that a plurality of processes is executed in one space as described above, although the photo sticker creating apparatus 1 can advantageously be reduced in size to make a footprint smaller, even when respective different groups of users concurrently perform operations in the respective spaces, only the two spaces are available for operations and, therefore, the number of groups of users capable of concurrently using the apparatus sets to be at most two. However, in case that the processes are executed in respective different spaces, it is possible to increase the number of users concurrently using the apparatus, and to improve a turnover rate. On the other hand, the footprint of the photo sticker creating apparatus 1 becomes relatively larger, and therefore, a disposition location must have a relatively large area.

The configuration of units of the photo sticker creating apparatus 1 is arbitrary and a unit configuration other than the described configuration may be used. A method of serving to multiple customers is arbitrary. For example, one photographing space and two editing spaces may be disposed. This configuration can improve the turnover rate of the photo sticker creating apparatus. Alternatively, two photographing spaces and two editing spaces may be disposed, respectively. In this case, since two (i.e., multiple) spaces are disposed for each of the photographing and the editing, it is possible to further improve the turnover rate of the photo sticker creating apparatus.

2.2. Overall Operation

Figure 5:
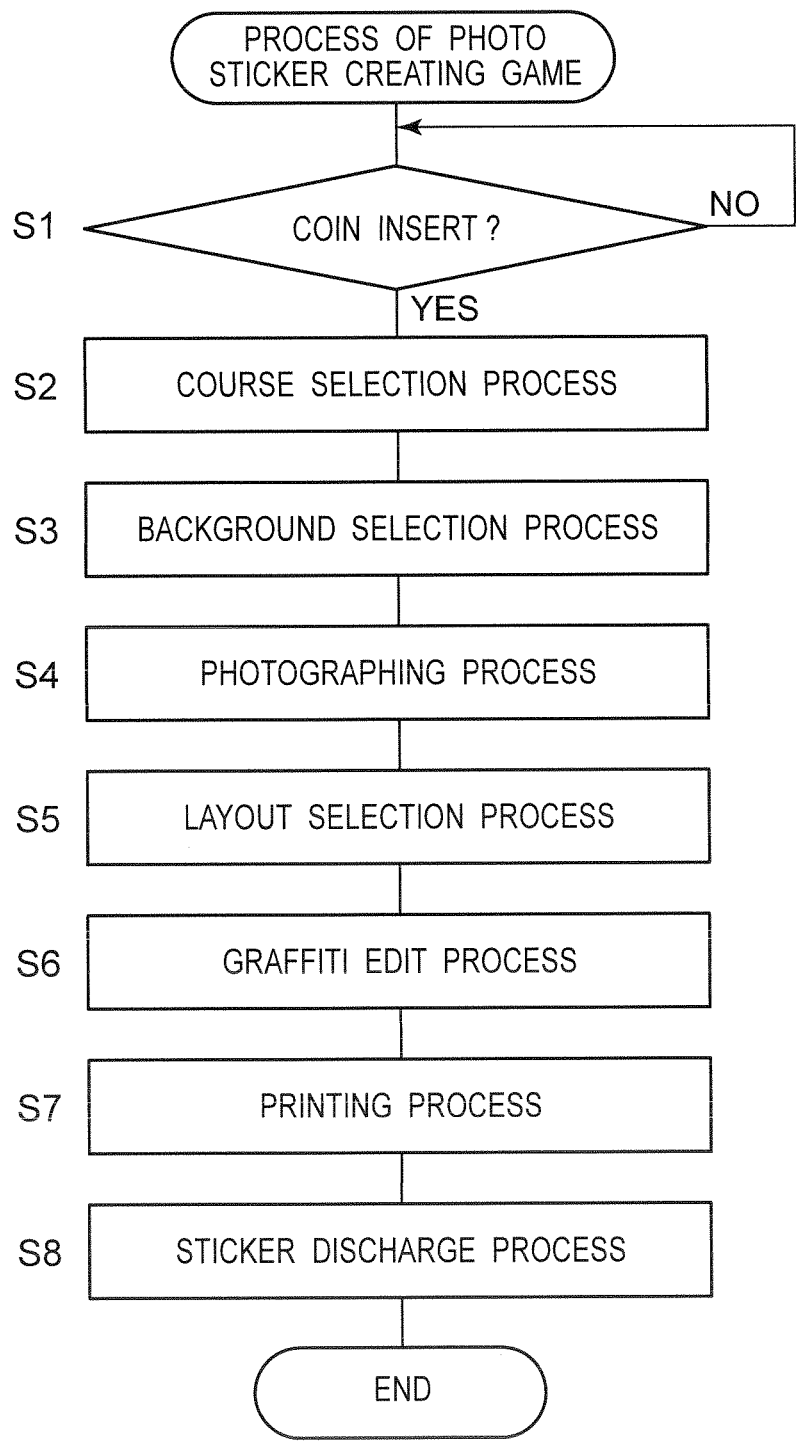
FIG. 5 is a flowchart showing a series of operations related to the photo sticker creating game by the photo sticker creating apparatus 1.

An operation related to the photo sticker creating game of the photo sticker creating apparatus 1 will be described. As described above, the photo sticker creating apparatus 1 composites a foreground or a background with a user's photographed image, and prints and outputs the image subjected to an edit process such as writing graffiti on a sticker sheet. FIG. 5 is a flowchart showing a series of operations related to the photo sticker creating game in the photo sticker creating apparatus 1. An overall operation of the photo sticker creating apparatus 1 will be described below with reference to the flowchart of FIG. 5.

When a user puts coins into the coin insert/return slot 29 in a predetermined amount required for playing the game in the photo sticker creating apparatus 1 (S1), the controller 11 starts the photo sticker creating game. It is noted that, among processes described below, a course selection process (S2), a background selection process (S3), a photographing process (S4), and a layout selection process (S5) are executed for a user present in the photographing space R1. A graffiti edit process (S6), a printing process (S7), and a sticker discharge process (S8) are executed for a user present in the editing space R2.

First, the controller 11 executes the course selection process (S2). In the present embodiment, one course can be selected from a plurality of courses. In the present embodiment, for example, a "normal course" and an "easy course" are prepared. The easy course is a course intended for a user unfamiliar with the operation of the photo sticker creating apparatus 1 and is a course in which the user can proceed with the game through an operation simpler than the normal course. The controller 11 displays a course selection screen for allowing the user to select a course of the game on the touch panel monitor 23 of the image photographing section 110. The user operates the touch panel monitor 23 on the course selection screen to select a desired course. The controller 11 stores the information of the course selected by the user in the RAM 17.

After termination of the course selection process (S2), the controller 11 executes the background selection process (S3). In the background selection process, a background or foreground image to be composited with the photographed image is selected based on an instruction from a user. It is noted that, in the following description, for convenience of description, background images or foreground images are collectively referred to as a "background image." The background selection process (S3) will be described below in detail.

After termination of the background selection process (S3), the controller 11 executes the photographing process (S4). In the photographing process, the controller 11 controls the portions of the image photographing section 110 to take an image (photograph) of the user (object). In this case, a plurality of images (photographs) of the user (object) is taken in series. This enables the user to photograph images in various poses. The number of photographed images may be the same as the number of arrangement regions of the images printed on a photo sticker. Alternatively, the number of photographed images may be made larger than the number of arrangement regions of the images printed on a photo sticker so that the user selects an image printed on a photo sticker out of the photographed images. The trimming range selection process will be described below in detail.

After termination of the photographing process (S4), the controller 11 displays a guidance screen for guiding the user to the editing space R2 on the touch panel monitor 23. The user moves to the editing space R2 in accordance with the display of the guidance screen displayed on the touch panel monitor 23 and subsequently performs an operation in the editing space R2. After termination of the photographing process (S4), the controller 11 further executes the layout selection process (S5). It is noted that the layout selection process (S5) may be executed in the photographing space R1.

The layout selection process is a process of determining a layout of a photo sticker. A plurality of photo sticker layouts is prepared in the photo sticker creating apparatus 1 so that a user selects a desired layout from a plurality of the layouts.

After termination of the layout selection process (S5), the controller 11 executes the graffiti edit process (S6). The graffiti edit process is a process of accepting decoration to a photographed image by a user. Concretely, the user can operate the stylus pen 37 on the tablet built-in monitor 33 disposed on the rear face of the photographing unit 10 in the editing space R2 so as to write graffiti (desired characters, graphics, drawings) on a photographed image. In addition, the user can operate the stylus pen 37 on the tablet built-in monitor 33 to give an instruction for pasting a decoration image (a predetermined drawing pattern, a predetermined text, and a combination thereof) prepared in advance to the photographed image onto a desired region of the photographed image. In the graffiti edit process, the controller 11 accepts an instruction relate to a graffiti writing operation and a decoration image from a user and composites the line image generated by writing graffiti or the decoration image of the instruction with the photographed image. This graffiti process enables a user to create a photo sticker of favorite design. It is noted that, although the operation is performed by using the stylus pen 37 in the above description, the operation may be performed by using a finger.

It is noted that the contents of the graffiti edit operation provided to a user in the graffiti edit process differs depending on a course selected by the user at the start of the game. For example, since the easy course is intended for a user unfamiliar with the photo sticker creating game, a procedure of operation of writing graffiti is made easier or the number of types of selectable operations is reduced as compared to the normal course. On the other hand, more various and complicated functions are provided to a user in the normal course as compared to the easy course so that the user can more elaborately write desired graffiti.

After termination of the graffiti edit process (S6), the controller 11 executes the printing process (S7) and the sticker discharge process (S8). In the printing process, the controller 11 edits an image for print based on the background image selected in the background selection process (S3), the layout selected in the layout selection process (S5), and the contents of the graffiti and decoration image of the instruction given in the graffiti edit process (S6). Then, the controller 11 controls the printers 51a, 51b in the printing section 130 to print the edited image on the sticker sheet 55.

After the printing is completed, the sticker sheet 55 printed with the edited image is discharged from either of the sticker discharge ports 39a, 39b. In a post customer process corresponding to a waiting time of the printing process, the controller 11 prompts the user to enter an e-mail address or an ID for SNS and transmits the image data edited for print through the communication device 13 to an external server. The user can download the image data from the server to a smartphone etc., of the user to enjoy the image data.

As a result of the procedures as described above, a photo sticker is generated that includes an image acquired by applying desired decoration to a user's image.

2.3. Content Image Data Generation Process

Figure 6A:
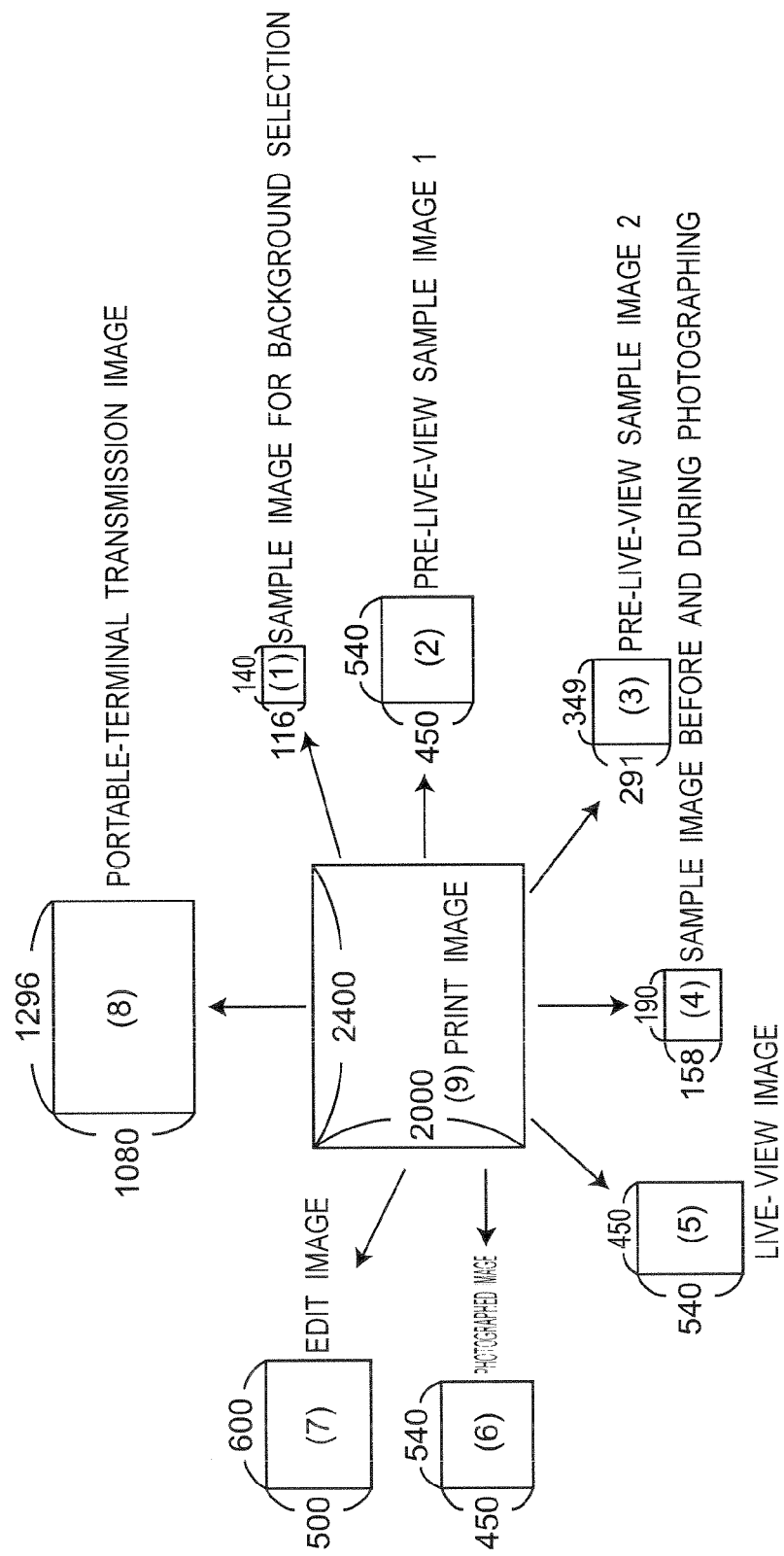
FIG. 6A is a schematic for explaining various content image data handled by the photo sticker creating apparatus according to the present embodiment.
Figure 7:
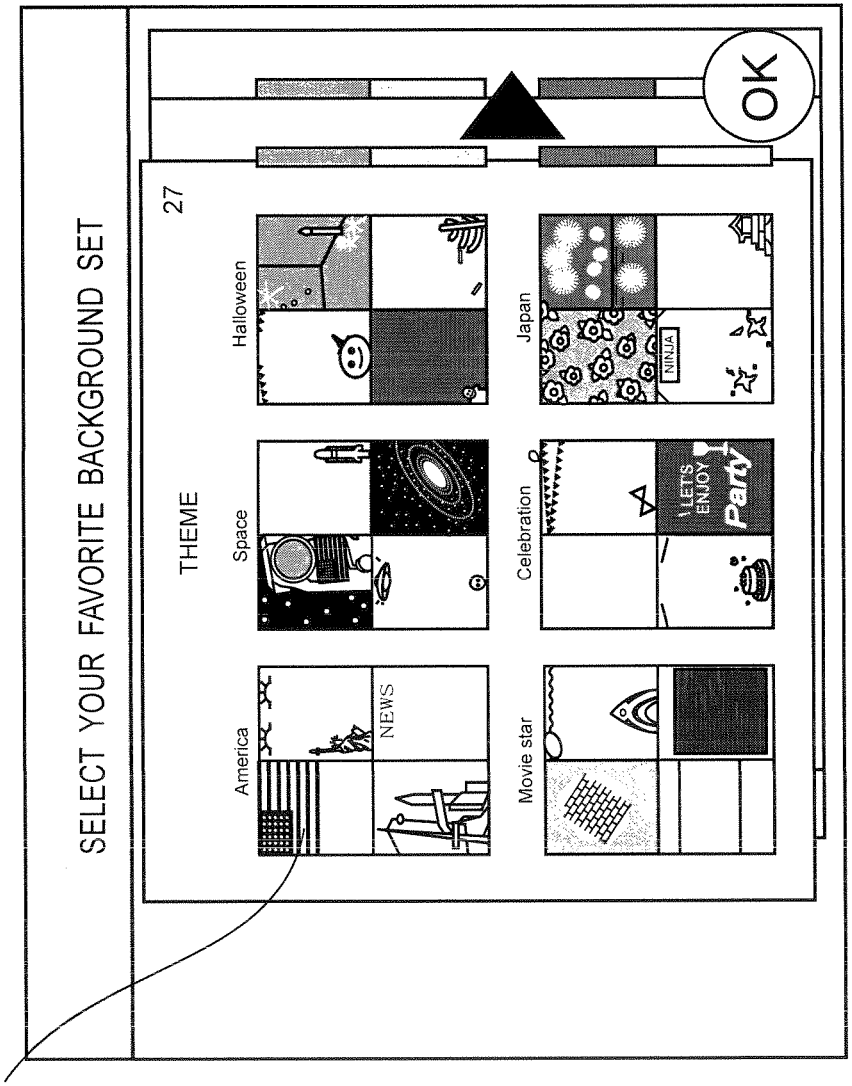
FIG. 7 is a diagram showing one example of the background selection screen.
Figure 8:
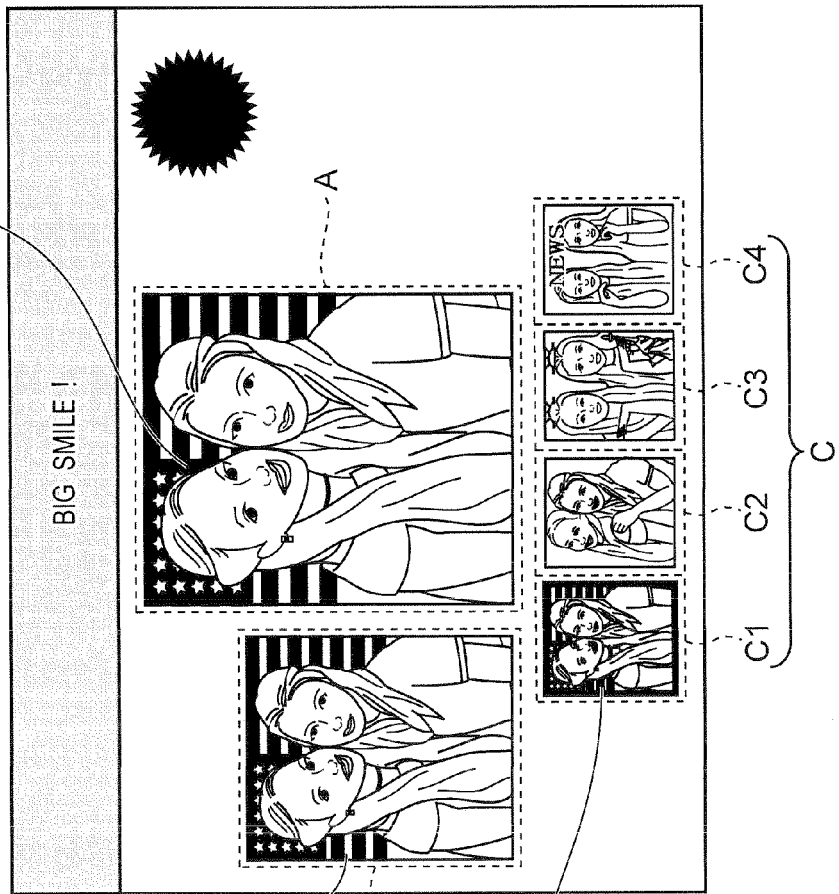
FIG. 8 is a diagram showing one example of a screen-before-photographing after selecting the "America" background set.
Figure 9:
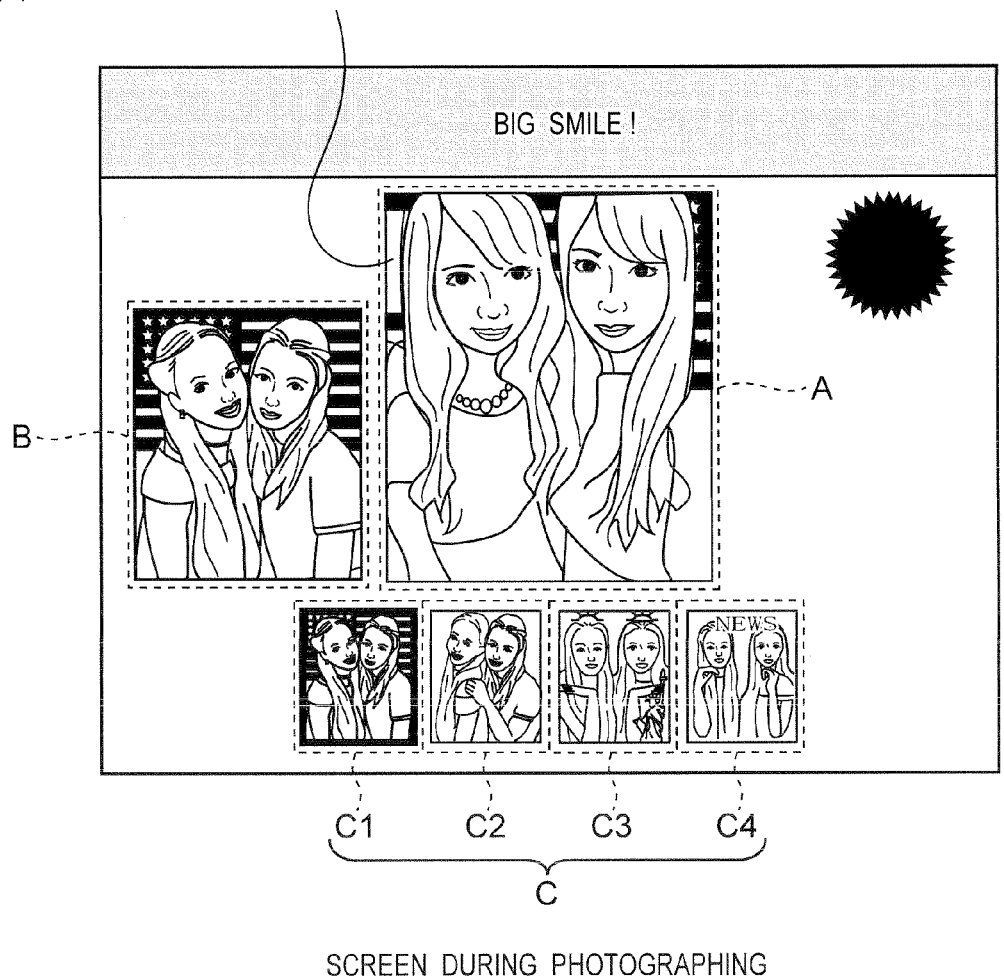
FIG. 9 is a diagram showing one example of a screen during photographing (screen-during-photographing).
Figure 10:
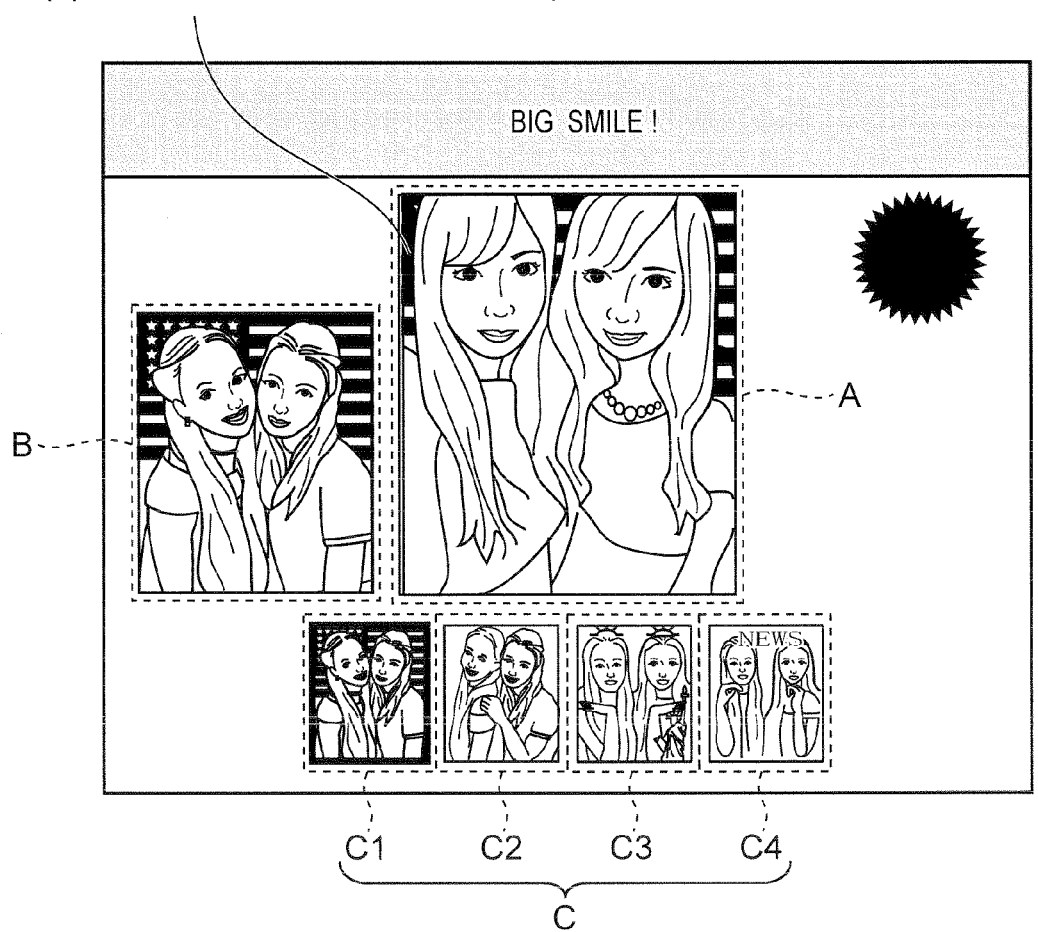
FIG. 10 is a diagram showing one example of a screen after photographing (screen-after-photographing).
Figure 11:
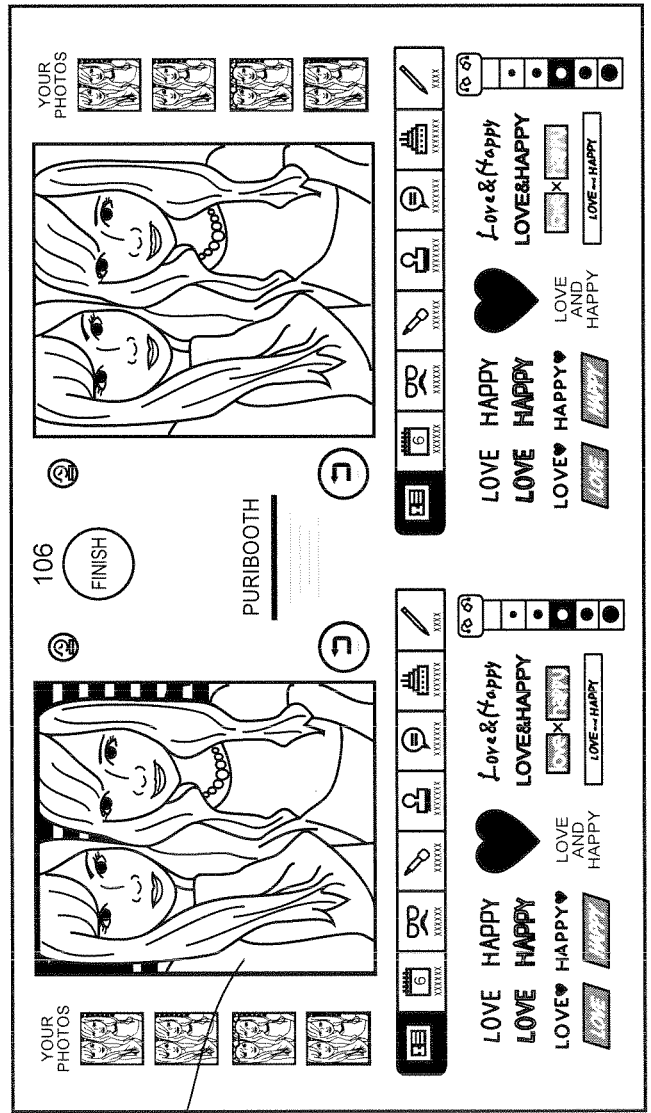
FIG. 11 is a diagram showing one example of an edit screen after photographing (edit screen).

FIG. 6A is a schematic for explaining various content image data handled by the photo sticker creating apparatus according to the present embodiment. The various content image data are image data corresponding to each of the following applications of (1) to (9):

(1) a sample image (116 pixel×140 pixel) for background selection (see FIG. 7);

(2) a pre-live-view sample image 1 (450 pixel×540 pixel without horizontal inversion) (see FIG. 8);

(3) a pre-live-view sample image 2 (291 pixel×349 pixel) (see FIG. 8);

(4) a sample image-before-photographing (158 pixel×190 pixel) (see FIG. 8);

(5) a live-view image (450 pixel×540 pixel with horizontal inversion) (see FIG. 9);

(6) a photographed image (450 pixel×540 pixel without horizontal inversion) (see FIG. 10);

(7) an edit image (500 pixel×600 pixel) (see FIG. 11);

(8) a portable-terminal transmission image (1080 pixel× 1296 pixel) (see FIGS. 12); and (9) a print image (2000 pixel×2400 pixel) (see FIG. 13).

As described above, in the photo sticker creating apparatus 1, content image data for photographing such as model image data and content image data for graffiti (for edit) such as stamp image data, character image data, background or foreground image data are prepared in various image sizes corresponding to respective applications. For example, for the content image data, in which the National Flag of America is displayed, a plurality of image data is prepared in different image data size corresponding to the respective applications of (1) to (9) (see FIGS. 7 to 13). Since image data of various sizes are prepared for the same content image in this way, conventionally, in case that the content image data are switched, all the image data of a plurality of image sizes must be installed for the same content image data. Therefore, there is such a problem that considerable time and effort are required for switching the content image data. For this problem, in the present embodiment, one predetermined image size (largest image size) is installed in the photo sticker creating apparatus 1 to generate the contents data for photographing and the content image data for graffiti having the image sizes for other applications based thereon. In detail, for a content image having one pattern (design), image data of various image sizes are generated based on the content image data having the largest image size. In this way, for a plurality of patterns (designs), image data of various image sizes are generated for each of the patterns (designs). With this configuration, it is not necessary to install the respective content image data of all the image sizes when the content image data are installed in the photo sticker creating apparatus 1, and therefore, it is possible to reduce the operation time and effort required for installing.

It is noted that, these content image data are installed by a maintenance person of the photo sticker creating apparatus 1. A process of generating various content image data will be described below.

Figure 6B:
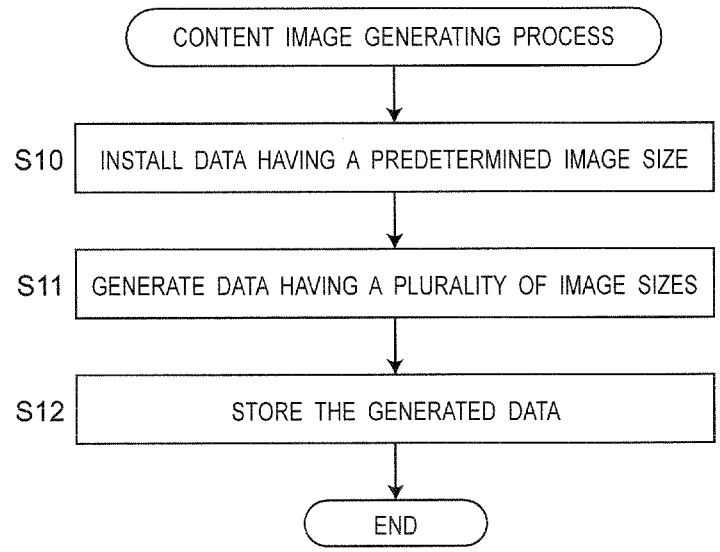
FIG. 6B is a flowchart of the process of generating various content image data handled by the photo sticker creating apparatus according to the present embodiment.

FIG. 6B is a flowchart of the process of generating various content image data handled by the photo sticker creating apparatus according to the present embodiment. First, for a content image installing operation, the maintenance person inserts into the media drive 14 in the photo sticker creating apparatus 1 a USB (universal serial bus) memory (the removable medium 15), which stores content image data having one predetermined size (in this embodiment, the image data for the print image (9) having the largest image size) for each of the content images of various patterns (designs). When the insertion of the USB memory is detected, an import instruction button for the content image data is displayed on the touch panel 23. The maintenance person presses (touches) the import instruction button. As a result, the controller 11 reads out the content image data stored in the USB memory and stores the data into the storage device 12 (step S10).

Next, the controller 11 generates the various content image data (the image data (1) to (8)) corresponding to the image sizes of the applications based on the content image data stored in the storage device 12. Subsequently, the controller 11 stores the generated content image data into the storage device 12 and this process is terminated.

It is noted that although the content image data of the predetermined image size is stored in the USB memory in the present embodiment, the data may be stored in a CD or a DVD and imported through a driver in the photo sticker creating apparatus 1 into the apparatus or may be imported through the internet into the apparatus.

As described above, when the content image data are updated for the photo sticker creating apparatus 1 of the present embodiment, only the data for the print image (9) (see FIG. 13) having the largest image size (2000 pixel× 2400 pixel) is first installed for each of the content images of the various patterns (designs). Subsequently, for each of the content images of the various patterns (designs), data of an image size corresponding to each application is generated based on the image data of the largest image size. In other words, the content image data (1) to (8) corresponding to the respective applications are generated based on the data for the print image (9) having the largest image size. With this configuration, it is not necessary to install the respective content image data of all the image sizes when the content image data are installed in the photo sticker creating apparatus 1, and therefore, it is possible to reduce the operation time and effort required for installing.

The generation of the image data (1) to (8) for the respective applications will be described below.

FIG. 7 is a diagram showing one example of the background selection screen. A user selects background image data through the background selection screen as a composition image to be composited with a photographed image acquired by photographing the user. FIG. 7 shows an example of the sample image (1) for background selection. In this case, any of background sets each having four scenes is selected. That is, the user selects one set from a plurality of sets and photographs an image for each of the scenes of the selected set. An upper-left National Flag of America image (116 pixel×140 pixel) in an upper-left "America" background set is generated from an National Flag of America having the largest image size (2000 pixel×2400 pixel) when the image is installed.

FIG. 8 is a diagram showing one example of a screen-before-photographing after selecting the "America" background set. In this case, a sample image in a thick frame shows a sample image to be subsequently photographed. The screen-before-photographing of FIG. 8 has regions A to C for displaying sample images (composition images of selected background images and model images) used as a reference when users photograph an image. The region C displays the sample images (4) (composition images of respective selected background images and model images). The users photograph images with reference to poses of models of first to fourth sample images (sample images in regions C1 to C4) displayed in the region C. Each of the regions A and B displays an enlarged image of the first to fourth sample images. In the present embodiment, the screen-before-photographing before photographing a first image is displayed. The region A displays the pre-live-view sample image 1 (2) that is the enlarged display of the sample image of the region C1. The region B displays the pre-live-view sample image 2 (3) that is the enlarged display of the sample image of the region C1. Similarly, the sample image of the region C2 is enlarged and displayed in each of the regions A and B before photographing a second image; the sample image of the region C3 is enlarged and displayed in each of the regions A and B before photographing a third image; and the sample image of the region C4 is enlarged and displayed in each of the regions A and B before photographing a fourth image. The users photograph images in the order of the first to fourth sample images (C1 to C4) displayed in the region C from the left. The National Flag of America background images having respective sizes (450 pixel ×540 pixel, 291 pixel×349 pixel, and 158 pixel×190 pixel) in the regions A, B, and C are generated from the National Flag of America having the largest image size (2000 pixel×2400 pixel) when the image is installed. In this case, the National Flag of America background image of the region A is not horizontally inverted from the National Flag of America having the largest image size (2000 pixel×2400 pixel).

FIG. 9 is a diagram showing one example of a screen during photographing (screen-during-photographing). In this case, the screen-during-photographing displayed at the time of photographing is displayed against the background image of the region C1 surrounded by the thick frame. The region A of FIG. 9 is switched from the sample image displayed in the region A of FIG. 8 to the live-view image (5) displaying a moving image of the users. That is, the users photograph an image through the live-view image displayed in the region A. An American flag background image of the size in the region A (450 pixel×540 pixel) is generated from the National Flag of America image having the largest image size (2000 pixel×2400 pixel) when the image is installed. The National Flag of America background image and the moving image of the users (persons) in the region A are horizontally inverted from the National Flag of America image having the largest image size (2000 pixel×2400 pixel).

FIG. 10 is a diagram showing one example of a screen after photographing (screen-after-photographing). A still image after photographing is displayed in the region A as an image of the photographed image (6) without horizontal inversion for a certain time and this image is then displayed in the region C1. In this case, the screen-after-photographing before being displayed in the region C1 is displayed. Therefore, when the photographing is completed for the sample image displayed in the region C2, a still image after the photographing is displayed in the region C2; when the photographing is completed for the sample image displayed in the region C3, a still image after the photographing is displayed in the region C3; and when the photographing is completed for the sample image displayed in the region C4, a still image after the photographing is displayed in the region C4. A National Flag of America background image of the size in the region A (450 pixel×540 pixel) is generated from the National Flag of America image having the largest image size (2000 pixel×2400 pixel) when the image is installed. The National Flag of America background image in the region A is not horizontally inverted from the National Flag of America image having the largest image size (2000 pixel×2400 pixel).

FIG. 11 is a diagram showing one example of an edit screen after photographing (edit screen). After all the photographing is completed, the users can write graffiti on a photographed still image (the edit image (7)). In the present embodiment, the number of users is set to be two. Therefore, the edit screen is a split screen divided into two and the users can edit an image through respective left and right screens. The still images to be edited may be the same image or may be respective different still images. A National Flag of America background image of the size for the edit image (7) (500 pixel×600 pixel) is generated from the American flag image having the largest image size (2000 pixel×2400 pixel) when the image is installed.

Figure 12:
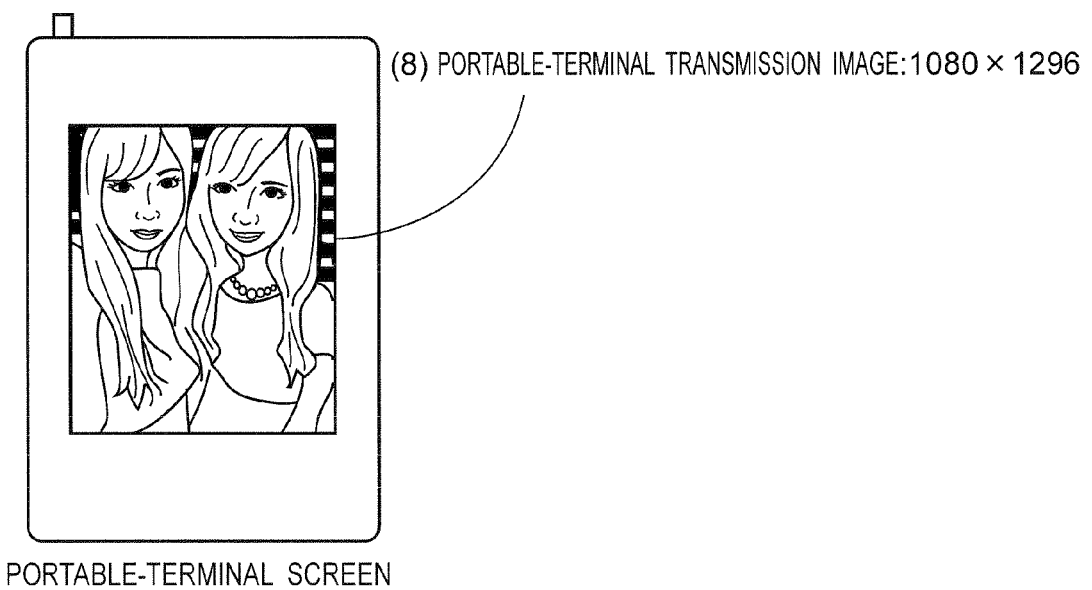
FIG. 12 is a diagram showing one example of a screen for transmission to a portable terminal after photographing (portable-terminal screen).

FIG. 12 is a diagram showing one example of a screen for transmission to a portable terminal after photographing (portable-terminal screen). The users can transmit a still image after photographing (a portable-terminal transmission image) as image data to user's portable telephones. A National Flag of America background image of the size for the portable-terminal transmission image (8) (1080 pixel× 1296 pixel) is generated from the National Flag of America image having the largest image size (2000 pixel×2400 pixel) when the image is installed.

FIG. 13 is a diagram showing one example of a screen for print after photographing (division-selection-screen print screen). The users select a layout for printing the photographed images through this screen. In FIG. 13, "2 sheets" is selected (surrounded by a frame). The selected print image (9) is printed on a sticker sheet of a predetermined size. It is noted that the print image (9) data is the image data of the largest size originally stored in the USB memory and the various image data are generated from this data. In addition, the image data printed on the sticker sheet is generated based on the content image data of the print image (9) installed first. That is, an National Flag of America background image of the size for the sticker sheet is generated from the National Flag of America image having the largest image size (2000 pixel×2400 pixel) when the image is installed.

It is noted that the image size of each of the content image data described above is one example and the image size is not limited thereto. Further, each application described above is one example and the applications are not limited thereto.

(a) First Modified Embodiment

In the above example, when content image data of an image size for a predetermined use is installed, image data having image sizes corresponding to the other applications are generated at the same time based on the installed content image data. However, this is not a limitation of the timing of generation of the various image data. For example, only the image data for the background-selection-time sample image (1) may first be generated and the image data of the other applications (the image date (2) to (8)) may be generated such that image data having an image size corresponding to each application is generated only for the content image selected by a user.

(b) Second Modified Embodiment

In the above example, the data of various image sizes are generated. However, the content image data may be changed in shape (image size and horizontal to vertical ratio) and angle of view depending on each application. For example, in the above example, the background-selection-time sample image (1) may be changed to form shapes such as a square, a vertical rectangle of an intermediate image size, a horizontal rectangle of an intermediate image size, an image for a whole body (rectangle with an horizontal to vertical ratio of 3:4), or an image for close up (rectangle with an horizontal to vertical ratio of 1:1.2).

(b) Third Modified Embodiment

The image sizes of the photographing content image data and the graffiti content image data themselves are changed in the above example. However, a portion of an imported image may be changed. For example, red or blue portion of an image of a national flag may be changed to black or, if an image includes characters (e.g., information on apparatus disposition location such as America), the font thereof may be changed to other fonts such as Gothic and Mincho typefaces. In this case, character data such as font, color, and position are stored as a table separately from the image data and a program is changed based on this table.

(d) Fourth Modified Embodiment

A language translation function may be further included in the above example. This configuration enables batch conversion of text information in the apparatus to, for example, English or Japanese, when the content image data is installed. Therefore, since the apparatus does not have to store all the language data of Japanese and English (the apparatus stores only one of the language data), a memory capacity in the apparatus can be reduced. Although English and Japanese are described in this example, the same applies to other languages.

(e) Fifth Modified Embodiment

Further, for applications other than the image data (1) to (8) as described above, an image may be resized for still image data inserted in a portion of moving image data, image data for portable telephones (such as an image displayed as an example image in instructions on how to play a game), and image data for advertising image data inserted in a sticker sheet (sticker sheet).

(f) Sixth Modified Embodiment

The still image data corresponding to each application are generated in the above example. However, moving image data of a predetermined image size may be imported to generate moving image data of other image sizes, or a portion of moving image data may be imported as a still image to generate still image data of sizes corresponding to the applications based on the still image data.

(g) Seventh Modified Embodiment

The image data of the image sizes corresponding to the other applications are generated based on the print image (9) having the largest image size in the above example. However, the image data of the image sizes corresponding to the applications may be generated from image data of a medium size rather than generating various image data from the largest size.

(h) Eighth Modified Embodiment

The apparatus may be configured such that a maintenance person (an installing person) can select predetermined content image data for developing image data of image sizes corresponding to the other applications at the time of installing.

3. Conclusion

As described above, the photo sticker apparatus 1 according to the present embodiment is an image processing apparatus for editing an image by using content images different in image size for pattern content image depending on applications. The photo sticker apparatus 1 includes a data acquiring unit 11 configured to acquire content image data having a predetermined image size (image for print data (9) having horizontal and vertical size of 2000 pixel×2400 pixel); an image processor 11 configured to generate image data of an image size corresponding to each application based on the acquired content image data; and a data storage device 12 configured to store the acquired image data and the generated image data.

With this configuration, by installing the content image data of one image size, the image sizes corresponding to all the applications can be generated and stored. This eliminates the need to install the content image data of all the image sizes corresponding to the applications, and therefore, it is possible to reduce the time and effort required for installing.

(Other Embodiments)

The various ideas described in the embodiments can appropriately be combined and can appropriately be changed, replaced, added, omitted, etc., based on common general technical knowledge of those skilled in the art. Other configuration applicable to the ideas disclosed in the embodiments will be described below.

In addition, the order of the processes may appropriately be changed in the operation of the example of the photo sticker creating apparatus shown in the flowchart of FIG. 5. For example, although the background selection process (S3) is executed before the photographing process (S4) in the flowchart of FIG. 5, the background selection process may be executed after the photographing process. In addition, although the layout selection process (S5) is executed after the photographing process (S4), the layout selection process may be executed before the photographing process.

The ideas shown in the above embodiments are applicable to an apparatus other than the photo sticker creating apparatus. That is, the ideas disclosed in the above embodiments are applicable to any image processing apparatus that is an apparatus compositing a composition image with a photographed image and that displays a selection screen for selecting a composition image to be composited with the photographed image.

The embodiments described above disclose the following ideas of an image processing apparatus etc. It is noted that the photo sticker creating apparatus 1 is one example of an image processing apparatus. The camera 21 is one example of a photographing portion. Each of the background set and the background image is one examples of an image for composition. The base image 71 is one example of an image selection region. The background selection screen 200 is one example of a selection screen. The controller 11 is one example of a data acquiring unit. The touch panel monitor 23 is one example of an instruction accepting portion. A configuration of combination of the controller 11 and the touch panel monitor 23 is one example of a display device. Each of the printers 51a, 51b and the printing section 130 is one example of a printing section. In this case, the data acquiring unit acquires content image data having a certain image size. In addition, the display device displays the stored content image data in accordance with each application. Further, the controller 11 is one example of an image processor and the image processor generates image data of an image size corresponding to each application based on the acquired content image data. Each of the storage device 12, the removable medium 15, and the RAM 17 is one example of a data storage device. The data storage device stores the acquired image data and the generated image data.

(1) An image processing apparatus (1) is an image processing apparatus 1 for editing an image by using content images different in image size for the same content image depending on applications. The image processing apparatus (1) includes:

a data acquiring unit 11 configured to acquire content image data having a predetermined image size;

an image processor 11 configured to generate image data of an image size corresponding to each application based on the acquired content image data; and a data storage device 12 configured to store the acquired image data and the generated image data.

With this configuration, by installing the content image data of one image size, the image sizes corresponding to all the applications can be generated and stored. This eliminates the need to install the content image data of all the image sizes corresponding to the applications, and therefore, it is possible to reduce the time and effort required for installing.

(2) In addition, the content image data includes background image data to be composited with a video image including a user as an object, and the image processing apparatus (1) further includes a display device (11, 23) for displaying the background image data in a size corresponding to each application.

(3) In addition, the content image data having the predetermined image size is image data having a largest image size in the content image data used in various applications.

With this configuration, image data corresponding to each application is generated based on the print image data having the largest size. Therefore, image deterioration can be suppressed to the minimum.

(4) The image processor 11 generates image data of an image size corresponding to each application at the time of acquisition of the content image having the predetermined image size.

(5) The image processor 11 generates image data of an image size corresponding to each application for the selected content image data when one content image data is selected from the content image data after acquiring the content image having the predetermined image size.

With this configuration, a capacity of storage in the storage device 12 can be minimized.

(6) An image processing method is an image processing method of editing an image by using content images different in image size for the same content image depending on applications. The image processing method includes acquiring content image data having a predetermined image size;

generating image data of an image size corresponding to each application based on the acquired content image data; and storing the acquired image data and the generated image data.

(7) A non-transitory computer-readable storage medium stores an image processing program for allowing a computer to execute the image processing method as described above.

What is claimed is:

1. An image processing apparatus for editing an image by using content images different in image size for the same content image depending on applications, the image processing apparatus comprising:

a data acquiring unit configured to acquire content image data having a predetermined image size;

an image processor configured to generate image data of an image size corresponding to each application based on the acquired content image data, wherein the generated image data is not separately installed in the image processing apparatus; and a data storage device configured to store the acquired content image data and the generated image data;

wherein the data acquiring unit acquires the content image data before the content image data is utilized by any of the applications; and wherein the content image data includes background image data to be composited with a video image including a user as an object, and the image processing apparatus further includes a display device configured to display the background image data in a size corresponding to each application.

2. The image processing apparatus according to claim 1, wherein the image processor generates image data of an image size corresponding to each application at the time of acquisition of the content image having the predetermined image size.

3. The image processing apparatus according to claim 1, wherein the image processor generates image data of an image size corresponding to each application for the selected content image data when one content image data is selected from the content image data after acquiring the content image having the predetermined image size.

4. An image processing apparatus for editing an image by using content images different in image size for the same content image depending on applications, the image processing apparatus comprising:

a data acquiring unit configured to acquire content image data having a predetermined image size;

an image processor configured to generate image data of an image size corresponding to each application based on the acquired content image data; and a data storage device configured to store the acquired content image data and the generated image data;

wherein the content image data having the predetermined image size is image data having a largest image size in the content image data used in various applications.

5. An image processing method for editing an image by using content images different in image size for the same content image depending on applications of an image processing apparatus, the image processing method comprising:

acquiring content image data having a predetermined image size;

generating image data of an image size corresponding to each application based on the acquired content image data, wherein the generated image data is not separately installed in the image processing apparatus; and storing the acquired content image data and the generated image data;

wherein the content image data is acquired before the content image data is utilized by any of the applications; and wherein the content image data includes background image data to be composited with a video image including a user as an object, and the image processing apparatus further includes a display device configured to display the background image data in a size corresponding to each application.

6. A non-transitory computer-readable storage medium storing an image processing program for allowing a computer to execute the image processing method according to claim 5.

* * * * *